Aug. 7, 1956
J. SZEMZÖ
2,757,450
SHEARING HEAD OF MECHANICAL SHAVER
Filed May 20, 1953
2 Sheets-Sheet 1
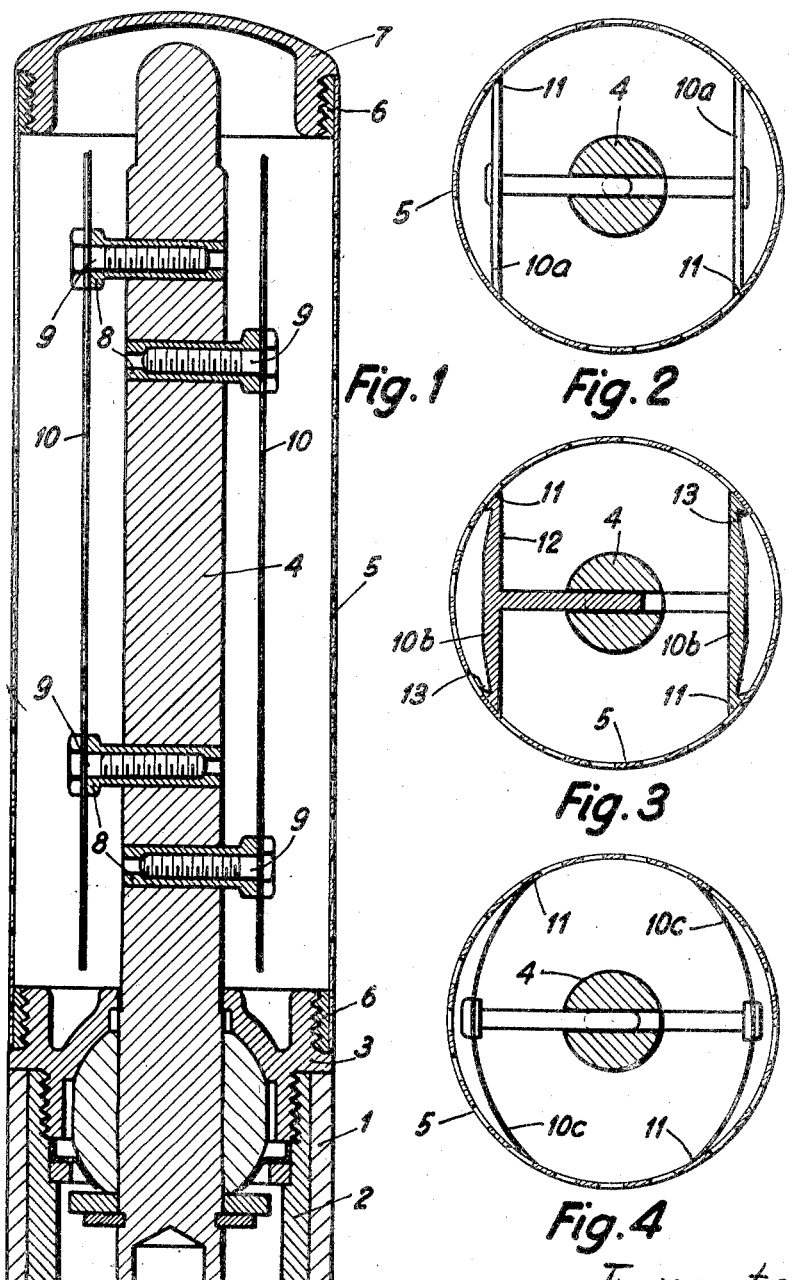
Inventor
Jean Szemzö
By
Young, Emery & Thompson
Attys.

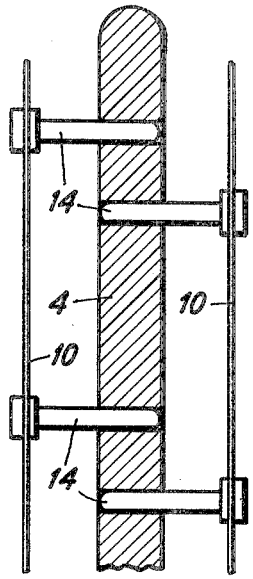 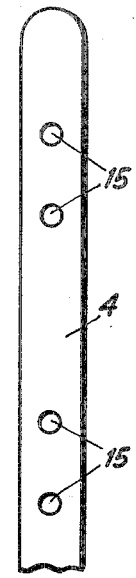 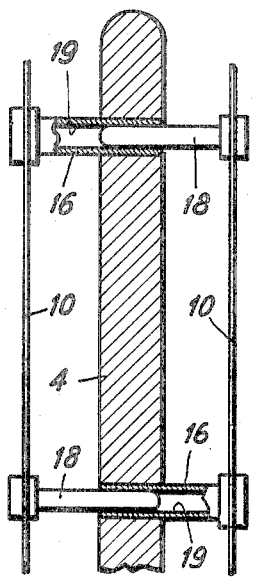 
    Fig. 5      Fig. 6      Fig. 7      Fig. 8
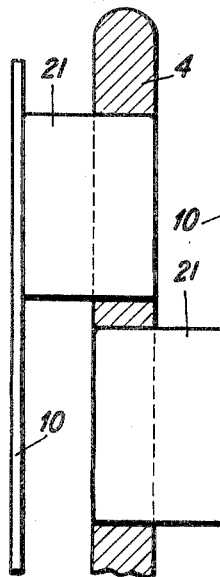 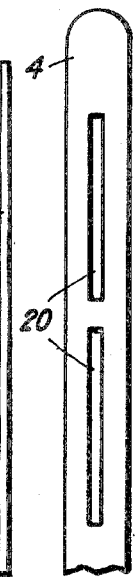 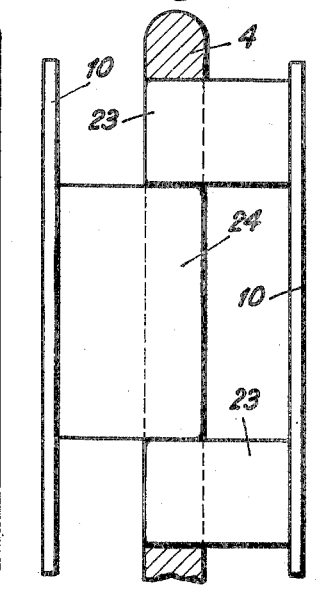 
    Fig. 9      Fig. 10      Fig. 11      Fig. 12
Inventor
Jean Szemző
By Young, Emery + Thompson
Attys.

United States Patent Office 2,757,450
Patented Aug. 7, 1956

2,757,450

SHEARING HEAD OF MECHANICAL SHAVER

Jean Szemzö, Zurich, Switzerland, assignor to Rotovent A. G., Zurich, Switzerland Application May 20, 1953, Serial No. 356,175

Claims priority, application Switzerland January 31, 1953

7 Claims. (Cl. 30—43)

My present invention relates to improvements in the shearing head of mechanical shavers of the type comprising a thin-sheet hair sieve of hollow cylindrical shape and at least one cutting blade adapted to be actuated by a driving member on the hair-sieve inside, such member moving about the axis of the hair sieve.

In known shearing heads of this type, the cutting blade or knife extends radially and is relieve-ground so that its edge presents a suitable cutting angle.

The shearing head disclosed by my present invention is characterized in that the knife comprises at least one support which presents two spaced areas forming flanks of cutting edges in symmetrical relation to a radial plane in which the support is guided in a radial aperture of the driving member, the said support through said areas bearing on the hair-sieve inside at least during operation of the shaver.

One form of my invention and a plurality of modifications of certain details are shown in the accompanying drawings in which Fig. 1 is a longitudinal section through the shearing head, Figs. 2 to 4 each show a cross section, similar to each other, depicting three different knife cross-sectional shapes.

Fig. 5 illustrates, in a longitudinal section similar to Fig. 4, a first modification of the bearing arrangement of the knives on the driving shaft, Fig. 6 is an appurtenant elevation of this driving shaft, and Figs. 7 to 12, which pairwise are similar to the Figs. 5 and 6, show three further modifications of the bearing arrangement of the knives on the driving shaft.

In Fig. 1 is shown the shearing-head front portion of a mechanical shaver. In a casing 1 is fixed a sleeve 2 into which is screwed the stationary portion 3 of a bearing for a driving shaft 4. A cylindrical hair sieve 5 at both ends is provided with brazed-on internally-threaded rings 6 of which one is screwed down on the bearing portion 3. Into the other ring 6 is screwed a cover 7.

The driving shaft 4 comprises four radial smooth and continuous bores of which all are situated in one and the same diametrical plane. Movable in the said bores are guide bushes 8 of which each by means of a screw 9 is secured to one or the other of two knives 10. Each guide bush 8 together with the appurtenant screws 9 forms a cylindrical carrying pin, i. e. a knife support. On both knives 10 the carrying pins are similarly disposed, namely displaced from the center towards one end of the knife (Fig. 1). The four carrying pins, two for each knife, are separately mounted in four of the said radial bores of the driving shaft 4.

The two knives comprise two spaced areas in symmetrical relation to the diametrical plane in which the said bores are situated wherein are mounted the supports of both knives independently of each other, the knives through said areas bearing on the inside of the hair sieve 5 at least during the operation of the shaver. The said areas are shown at 11 in Figs. 2 to 4, the knives being designated by 10a, 10b and 10c respectively. In the form shown in Figs. 2 and 3, the knives are rigid, each in cross-section extending along a chord of the hair sieve 5. In the form shown in Fig. 2, each bearing area 11 together with the side 12 facing the driving shaft 4 forms a cutting edge. Of the four cutting edges thus formed, two diametrically opposite edges are operative at any one time, and the other two cutting edges become operative when the direction of rotation of shaft 4 changes.

In the form shown in Fig. 3, each of the two bearing faces of each knife 10b forms two cutting edges in combination with two other areas 12, 13. The area 12 here again is that side of the knives which faces the shaft 4, whilst the areas 13 are obtained by relieve-grinding the knives.

In all the forms shown, the knives with their areas 11 are urged through centrifugal action against the hair sieve 5, the knives and their supports being subjected to such action.

In the form shown in Fig. 4, the knives 12c consist of thin spring-steel blades which, as shown, are curved outwardly towards the hair sieve 5 under said centrifugal action.

The modified means shown in Figs. 5 and 6 for guiding the knives 10 on the shaft 4, differs from those shown in Fig. 1 only in that the two-piece carrying pins 8, 9 are replaced by one-piece pins 14 which also are cylindrical and riveted or welded to the knives. In Fig. 6 are shown the four radial bores 15 for the four carrying pins. Here also, the two knives and their supports 14 are similar to each other.

In the form shown in Figs. 7 and 8, one of two knife supports 18 comprises a tubular member 16 movably mounted in a radial bore 17 of driving shaft 4, whilst the other support 18 is movably mounted in the longitudinal bore 19 of the tubular member 16 of the opposite knife.

In the forms shown in Figs. 9, 10 and 11, 12 the radial openings in the driving shaft 4 are slots 20 and 22 respectively, in which are mounted flat supports 21 and 23, 24 respectively, of the knives 10. It will be seen that in the forms shown in Figs. 5 to 12 the supports for the two knives are guided independently of each other in one or more radial openings of the driving shaft so that the centrifugal forces, as mentioned above, may urge the knives against the hair sieve through their faces 11 which form one flank of cutting edges.

The invention also applies to shearing heads comprising a semi-cylindrical hair sieve and only one knife which, in this case, oscillates. Especially when providing a cylindrical hair sieve, there may be provided only one knife, or, again, three or more knives in lieu of two. Thus, for example, there may be provided two pairs of diametrically opposite knives.

I claim:

1. A shearing head of a mechanical shaver, comprising a cylindrical hair sieve, a power-driven rotatable member extending inside said hair sieve along the longitudinal axis thereof, two knives mounted on said rotatable member for centrifugal shearing contact against the inner periphery of said hair sieve, said member having aperture guide means extending therethrough in a diametrical plane and each of said two knives including at least one support guided in said means for free radial motion and a spring-steel blade which has two parallel cutting edges symmetrical to each other with regard to said diametrical plane and which is flat and extends along a chord perpendicular to said diametrical plane when the said member is at rest, but arched outwards towards the said hair sieve under the action of the centrifugal forces acting on the whole knife when said member rotates.

2. A shearing head according to claim 1, in which the said member has four axially spaced, cylindrical guide holes extending all in the same diametrical plane, and in which each knife has two supports including a cylindrical portion movably guided in one of said four guide holes.

3. A shearing head according to claim 2, in which the blades of the two knives have the same length and are disposed in oppositely facing relation with regard to each other and in which the said supports are arranged in the same disposition on both knives whereby the latter are interchangeable.

4. A shearing head according to claim 3, in which each support comprises an internally threaded bush including said cylindrical portion, and a screw for securing the said guide bush to one of said blades.

5. A shearing head according to claim 1, in which the said member has two axially spaced, cylindrical guide holes extending both in the same diametrical plane and in which each knife has two supports, the disposition of the latter being the same on both knives, a first one of these two supports of each knife comprising a tubular part slidably mounted in one of said guide holes, and the second support of the same knife being slidably engaged into the tubular part of the first support of the other knife.

6. A shearing head according to claim 1, in which the said member has a longitudinal slot constituting a guide hole and in which the said support of each knife consists of a flat longitudinally extending part slidably engaging said slot.

7. A shearing head of a mechanical shaver, comprising a cylindrical hair sieve, a power-driven rotatable member extending inside said hair sieve along the longitudinal axis thereof, a bearing for said rotatable member, a fixed bearing support having a seat, an internally threaded ring carried by one end of the cylindrical sieve, and threadedly mounted on said seat for securing the sieve to the bearing support, an internally threaded ring carried by the other end of the sieve, an externally threaded cap mounted in the last-mentioned ring, two knives mounted on said rotatable member for centrifugal shearing contact against the inner periphery of said hair sieve, said member having aperture guide means extending therethrough in a diametrical plane and each of said two knives including at least one support guided in said means for free radial motion and a spring-steel blade which has two parallel cutting edges symmetrical to each other with regard to said diametrical plane and which is flat and extends along a chord perpendicular to said diametrical plane when the said member is at rest, but arched outwards towards the said hair sieve under the action of the centrifugal forces acting on the whole knife when said member rotates.

References Cited in the file of this patent

UNITED STATES PATENTS

| | | |
|---|---|---|
| 2,253,016 | Collins | Aug. 19, 1941 |
| 2,265,281 | Hale | Dec. 9, 1941 |
| 2,269,875 | Huntington | Jan. 13, 1942 |
| 2,283,038 | Breitenstein | May 12, 1942 |
| 2,365,861 | Brander | Dec. 26, 1944 |